United States Patent
Shih (10) Patent No.: US 12,189,964 B2
(45) Date of Patent: Jan. 7, 2025

(54) DATA STORAGE SYSTEM AND PARAMETER MARGIN EVALUATION METHOD

(71) Applicant: Silicon Motion, Inc., Hsinchu County (TW)

(72) Inventor: Po-Yi Shih, Hsinchu County (TW)

(73) Assignee: Silicon Motion, Inc., Hsinchu County (TW)

( * ) Notice: Subject to any disclaimer, the term of this patent is extended or adjusted under 35 U.S.C. 154(b) by 115 days.

(21) Appl. No.: 18/074,527

(22) Filed: Dec. 5, 2022

(65) Prior Publication Data

US 2023/0305716 A1    Sep. 28, 2023

(30) Foreign Application Priority Data

Mar. 23, 2022  (TW) .................................. 111110809

(51) Int. Cl.
*G06F 3/06* (2006.01)
(52) U.S. Cl.
CPC .......... *G06F 3/0619* (2013.01); *G06F 3/0653* (2013.01); *G06F 3/0679* (2013.01)
(58) Field of Classification Search
CPC .. G06F 11/1044; G06F 11/30; G06F 13/1673; G06F 3/0619; G06F 3/0653; G06F 3/0679; G06F 9/22
See application file for complete search history.

(56) References Cited

U.S. PATENT DOCUMENTS

| | | | | |
|---|---|---|---|---|
| 2010/0115351 A1* | 5/2010 | Lin | ........................ | G11C 29/16 714/E11.002 |
| 2014/0229666 A1* | 8/2014 | Schoenborn | ........ | G11C 11/4074 711/167 |
| 2015/0002408 A1* | 1/2015 | Mozak | ................. | G11C 29/028 345/173 |
| 2016/0378582 A1* | 12/2016 | Choi | ................... | G06F 11/0727 714/37 |
| 2017/0038974 A1* | 2/2017 | Keshava | ............... | G06F 3/0653 |
| 2017/0177219 A1* | 6/2017 | Lee | ........................ | G06F 3/0679 |
| 2018/0157417 A1* | 6/2018 | Shih | ...................... | G06F 3/0634 |
| 2019/0227894 A1* | 7/2019 | Shih | ..................... | G06F 11/2273 |

(Continued)

FOREIGN PATENT DOCUMENTS

| | | |
|---|---|---|
| CN | 112256503 A | 1/2021 |
| CN | 112948189 A | 6/2021 |

(Continued)

*Primary Examiner* — Albert Decady
*Assistant Examiner* — Enamul M Kabir
(74) *Attorney, Agent, or Firm* — Winston Hsu (57) ABSTRACT

A method for evaluating a margin of at least one parameter utilized by a transmission interface includes: step (A) setting a value of a first parameter utilized by a host device to a first test value selected from a first group; (B) setting a value of a second parameter utilized by a data storage device to a second test value selected from a second group; (C) controlling the data storage device to perform a predetermined testing procedure to test whether the data storage device functions normally when the first test value and the second test value are applied; and (D) changing the first test value or the second test value and re-performing steps (A) to (C), wherein step (D) is repeatedly performed until all the test values in the first group and the second group have been tested.

18 Claims, 4 Drawing Sheets

(56) References Cited

U.S. PATENT DOCUMENTS

| | | |
|---|---|---|
| 2020/0035276 A1* | 1/2020 | Sirajudeen ............ G11C 7/1093 |
| 2020/0110716 A1 | 4/2020 | Mozak |
| 2021/0149581 A1* | 5/2021 | Kim ....................... G06F 3/0632 |
| 2022/0093197 A1* | 3/2022 | Wu ....................... G06F 13/1689 |
| 2022/0137854 A1* | 5/2022 | Lang ..................... G11C 29/023 |
| | | 711/154 |
| 2022/0206705 A1* | 6/2022 | Mayer .................. G11C 11/4074 |
| 2023/0055833 A1* | 2/2023 | He .................. G01R 31/318314 |

FOREIGN PATENT DOCUMENTS

| | | |
|---|---|---|
| CN | 113348447 A | 9/2021 |
| CN | 114064012 A | 2/2022 |
| TW | 202211215 A | 3/2022 |

* cited by examiner

DATA STORAGE SYSTEM AND PARAMETER MARGIN EVALUATION METHOD

BACKGROUND OF THE INVENTION

1. Field of the Invention

The invention relates to a parameter margin evaluation method, for evaluating an appropriate range of setting values of at least one parameter and determining a margin of said at least one parameter.

2. Description of the Prior Art

With the rapid growth of data storage technology in recent years, many data storage devices—such as memory cards manufactured in compliance with the Secure Digital (SD)/Multi Media Card (MMC) standards, Compact Flash (CF) standards, Memory Stick (MS) standards or Extreme Digital (XD) standards, as well as solid state drives, Embedded Multi Media Cards (eMMC) and Universal Flash Storage (UFS)—have been used widely for a variety of purposes. Therefore, the demand for data storage devices in various fields has also grown significantly. Take the UFS as an example, because the UFS provides high transmission speed and high stability, it has been widely used in consumer electronic products such as digital cameras, smart phones, notebook computers, and desktop computers.

The transmission interface of UFS adopts the physical layer (M-PHY) standard developed by the Mobile Industry Processor Interface (MIPI) alliance. As the UFS standard and the MIPI physical layer (M-PHY) standard continue to evolve, each UFS device and the electronic product (i.e. the host device) that equipped with the UFS transmission interface may use different versions of the MIPI physical layer standard, resulting in compatibility problem. For example, different versions of standard may apply different parameter settings, resulting in errors in the signal or data transmission between the host device and the UFS device due to incompatible parameter settings.

To avoid unnecessary errors caused by such compatibility problems, a parameter margin evaluation method capable of effectively evaluating the compatible margin of parameters is required.

SUMMARY OF THE INVENTION

It is an objective of the invention to evaluate an appropriate range of setting values of a parameter so as to determine a margin of the parameter.

According to an embodiment of the invention, a data storage system comprises a data storage device and a host device coupled to the data storage device. The host device determines a margin of a parameter utilized by at least one transmission interface of the data storage device and the host device. The host device performs a plurality of operations comprises: (A) issuing a first command to set a value of a first parameter utilized by the host device to a first test value, wherein the first test value is selected from a first group comprising a plurality of setting values associated with the first parameter; (B) issuing a second command to set a value of a second parameter utilized by the data storage device to a second test value, wherein the second test value is selected from a second group comprising a plurality of setting values associated with the second parameter; (C) controlling the data storage device to perform a predetermined testing procedure to test whether the data storage device functions normally when the first test value and the second test value are applied; and (D) changing the first test value according to the setting values comprised in the first group or changing the second test value according to the setting values comprised in the second group and re-performing operations (A) to (C), wherein operation (D) is repeatedly performed until all the test values in the first group and the second group have been tested.

According to another embodiment of the invention, a parameter margin evaluation method for evaluating an appropriate range of setting values of at least one parameter to determine a margin of said at least one parameter, which is a parameter utilized by at least one transmission interface in a data storage system, comprises following steps: (A) setting a value of a first parameter utilized by a host device of the data storage system to a first test value, wherein the first test value is selected from a first group comprising a plurality of setting values associated with the first parameter; (B) setting a value of a second parameter utilized by a data storage device of the data storage system to a second test value, wherein the second test value is selected from a second group comprising a plurality of setting values associated with the second parameter; (C) controlling the data storage device to perform a predetermined testing procedure to test whether the data storage device functions normally when the first test value and the second test value are applied; and (D) changing the first test value according to the setting values comprised in the first group or changing the second test value according to the setting values comprised in the second group and re-performing steps (A) to (C), wherein step (D) is repeatedly performed until all the test values in the first group and the second group have been tested.

These and other objectives of the present invention will no doubt become obvious to those of ordinary skill in the art after reading the following detailed description of the preferred embodiment that is illustrated in the various figures and drawings.

DETAILED DESCRIPTION

In the following, numerous specific details are described to provide a thorough understanding of embodiments of the invention. However, one of skilled in the art will understand how to implement the invention in the absence of one or more specific details, or relying on other methods, elements or materials. In other instances, well-known structures, materials or operations are not shown or described in detail in order to avoid obscuring the main concepts of the invention.

Reference throughout this specification to "one embodiment", "an embodiment", "one example" or "an example"

means that a particular feature, structure or characteristic described in connection with the embodiment or example is included in at least one embodiment of a plurality of embodiments. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or sub-combinations in one or more embodiments or examples.

In addition, in order to make the objects, features and advantages of the invention more comprehensible, specific embodiments of the invention are set forth in the accompanying drawings. This description is made for the purpose of illustrating the general principles of the invention and should not be taken in a limiting sense. It should be understood that the following embodiments can be implemented by software, hardware, firmware, or any combination thereof.

Figure 1:
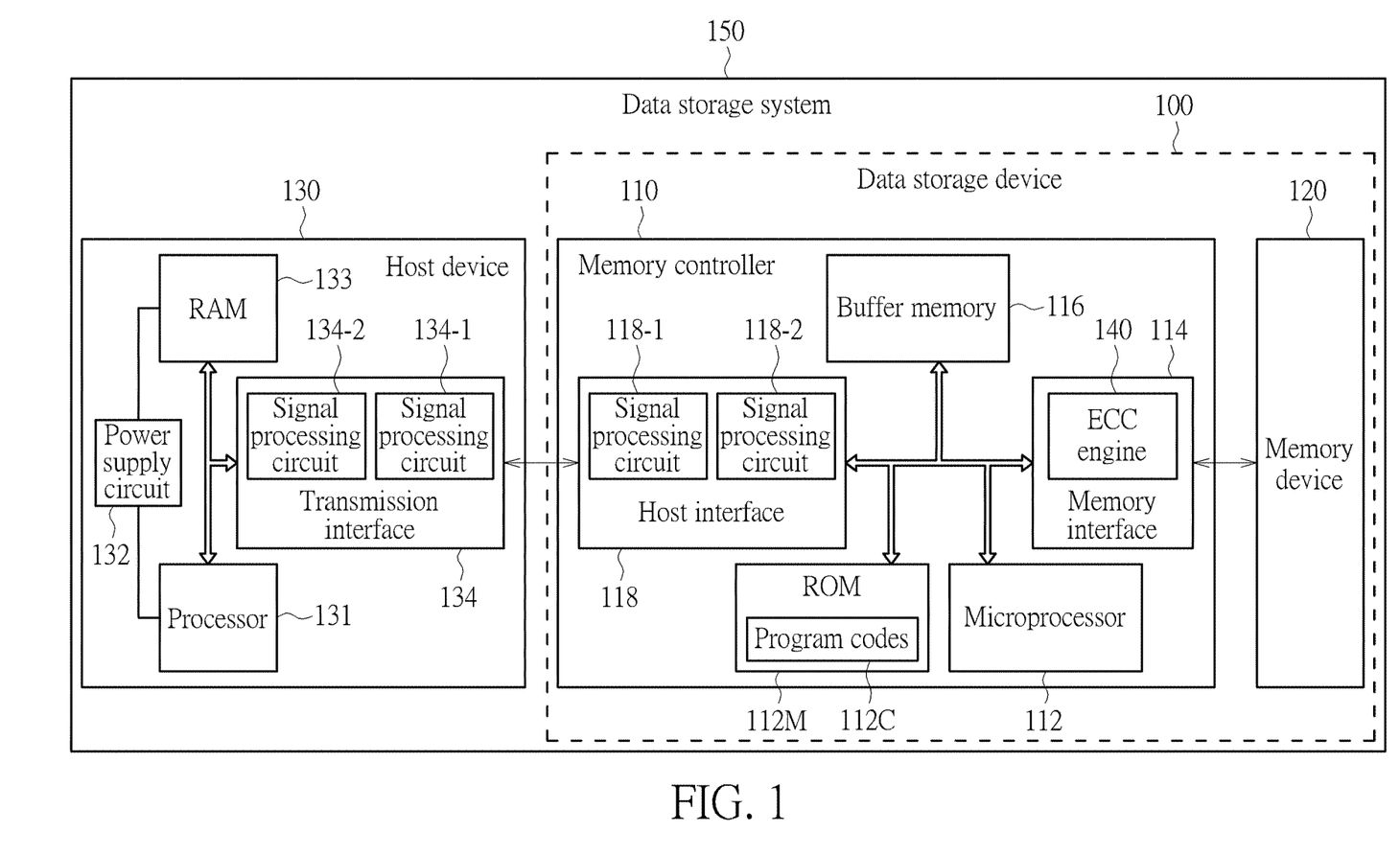
FIG. 1 shows an exemplary block diagram of a data storage system according to an embodiment of the invention.

FIG. 1 shows an exemplary block diagram of a data storage system according to an embodiment of the invention. The data storage system 150 may comprise a data storage device 100 and a host device 130.

The data storage device 100 may comprise a memory device 120 and a memory controller 110. The memory controller 110 is configured to access the memory device 120 and control operations of the memory device 120. The memory device 120 may be a non-volatile (NV) memory (e.g. a Flash memory) device and may comprise one or more memory elements (e.g. one or more Flash memory dies, or one or more Flash memory chip, or the likes).

The data storage device 100 may be coupled to a host device 130. The host device 130 may comprise at least one processor 131, a power supply circuit 132, at least one random access memory (RAM) 133, such as at least one dynamic RAM (DRAM), at least one static RAM (SRAM), and a transmission interface 134. The processor 131, the RAM 133 and the transmission interface 134 may be coupled to each other through a bus, and may be coupled to the power supply circuit 132 to obtain power. The processor 131 may be configured to control operations of the host device 130. The power supply circuit 132 may be configured to provide the processor 131, the RAM 133, the transmission interface 134 and the data storage device 100 with power. For example, the power supply circuit 132 may output one or more driving voltages to the data storage device 100. The data storage device 100 may obtain the one or more driving voltages from the host device 130 as the power of the data storage device 100 and provide the host device 130 with storage space. The transmission interface 134 may be configured to communicate with the data storage device 100, and the transmission interface 134 and the host interface 118 of the data storage device 100 may have symmetrical structures.

According to an embodiment of the invention, the host device 130 may issue commands, such as the read command or the write command, to the data storage device 100, so as to access the data stored in the memory device 120, or the host device 130 may issue commands to further control or manage the data storage device 100.

According to an embodiment of the invention, the memory controller 110 may comprise a microprocessor 112, a Read Only Memory (ROM) 112M, a memory interface 114, a buffer memory 116 and a transmission interface to be coupled to the host device 130, such as the host interface 118. The ROM 112M is configured to store program codes 112C. The microprocessor 112 is configured to execute the program codes 112C, thereby controlling access to the memory device 120. The program codes 112C may comprise one or more program modules, such as the boot loader code. When the data storage device 100 obtains power from the host device 130, the microprocessor 112 may perform an initialization procedure of the data storage device 100 by executing the program codes 112C. In the initialization procedure, the microprocessor 112 may load a group of In-System Programming (ISP) codes (not shown in FIG. 1) from the memory device 120. The microprocessor 112 may execute the group of ISP codes, so that the data storage device 100 has various functions. According to an embodiment of the invention, the group of ISP codes may comprise, but are not limited to: one or more program modules related to memory access (e.g. read, write and erase), such as a read operation module, a table lookup module, a wear leveling module, a read refresh module, a read reclaim module, a garbage collection module, a sudden power off recovery (SPOR) module and an uncorrectable error correction code (UECC) module, respectively provided for performing the operations of read, table lookup, wear leveling, read refresh, read reclaim, garbage collection, SPOR and error handling for detected UECC error.

The memory interface 114 may comprise an error correction code (ECC) engine 140. The ECC engine 140 may comprise an internal data buffer (not shown in FIG. 1) for buffering data, so as to facilitate the ECC engine 140 to perform encoding and decoding operations on the data. In the write procedure to write data into the memory device 120, the ECC engine 140 encodes the data to be written to the memory device 120, such as performing error correction code (ECC) encoding on the data to generate additional parity bits. In the read procedure to read data from the memory device 120, the ECC engine 140 decodes the data read from the memory device 120 to check and correct the error bits in the data when the error is correctable (as an example, the number of error bits in the data does not exceed the upper limit of the number of correctable error bits of the ECC engine 140).

Typically, the memory device 120 may comprise a plurality of memory elements, such as a plurality of Flash memory dies or Flash memory chips, and each memory element may comprise a plurality of memory blocks. The access unit of an erase operation performed by the memory controller 110 on the memory device 120 may be one memory block. In addition, a memory block may record (comprise) a predetermined number of pages, for example, the physical pages, and the access unit of a write operation performed by the memory controller 110 on the memory device 120 may be one page.

In practice, the memory controller 110 may perform various control operations by using its own internal components. For example, the memory controller 110 may use the memory interface 114 to control the access operations (especially the access operation for at least a memory block or at least a page) of the memory device 120, use the buffer memory 116 to perform necessary data buffer operations, and use the host interface 118 to communicate with the host device 130.

In an embodiment of the invention, the memory controller 110 may use the host interface 118 to communicate with the host device 130 in compliance with a standard communication protocol. For example, the standard communication protocol may comprise (but is not limited to) the Universal Serial Bus (USB) standard, the SD interface standard, the Ultra High Speed-I (UHS-I) interface standard, the Ultra High Speed-II (UHS-II) interface standard, the CF interface standard, the Multi Media Card (MMC) interface standard, the eMMC interface standard, the UFS interface standard, the Advanced Technology Attachment (ATA) standard, the Serial ATA (SATA) standard, the Peripheral Component Interconnect Express (PCI-E) standard, the Parallel Advanced Technology Attachment (PATA) standard, etc.

In an embodiment, the buffer memory 116 for providing data buffering may be implemented by a RAM. For example, the buffer memory 116 may be an SRAM, but the invention should not be limited thereto. In other embodiments, the buffer memory 116 may be a DRAM.

In an embodiment of the invention, the data storage device 100 may be a portable storage device (for example, the memory card in compliance with the SD/MMC, CF, MS and/or XD standard, the USB flash drives, or the likes), and the host device 130 may be an electronic device, such as a mobile phone, a notebook computer, a desktop computer . . . etc., capable of connecting to the data storage device. In another embodiment of the invention, the data storage device 100 may be a solid state hard disk or an embedded storage device in compliance with the UFS or the eMMC standards, and may be equipped in an electronic device such as a mobile phone, a notebook computer, or a desktop computer. In such an embodiment, the host device 130 may be a processor of the electronic device.

According to an embodiment of the invention, the data storage device 100 may be a storage device in compliance with the UFS standard, and the memory controller 110 of the data storage device 100 and the host device 130 may communicate with each other through the corresponding host interface 118 and transmission interface 134, respectively, to transmit data and signals between the data storage device 100 and the host device 130.

For example, the host interface 118 and the transmission interface 134 may respectively comprise signal processing circuits, such as the signal processing circuits 118-1 and 118-2 and the signal processing circuits 134-1 and 134-2, which operates in compliance with different layers of communication protocol. According to an embodiment of the invention, the signal processing circuits 118-1 and 134-1 may be physical layer signal processing circuits for processing the received signals (i.e., the RX signals) and the signals to be transmitted (i.e., the transmission signal or the TX signals) according to the physical layer communication protocol. For example, the signal processing circuits 118-1 and 134-1 may be physical layer (M-PHY) signal processing circuits implemented based on the communication protocols developed by the Mobile Industry Processor Interface (MIPI) alliance. The signal processing circuits 118-1 and 134-1 may perform operations such as amplification or attenuation, equalization processing, analog-to-digital or digital-to-analog conversion, frequency mixing, basic encoding or decoding, and unpacking of physical layer packets on the RX signals and the TX signals, respectively. The signal processing circuits 118-2 and 134-2 may be protocol layer signal processing circuits for performing corresponding signal processing on the RX signals and the TX signals according to the communication protocol of a layer higher than the physical layer. For example, the signal processing circuits 118-2 and 134-2 may perform corresponding signal processing on the RX signals and the TX signals in compliance with the Unified Protocol (UniPro) developed by the MIPI alliance, wherein the physical layer and the UniPro layer of the UFS device may be collectively named as the UFS Interconnect Layer (UIC) layer.

It is to be noted that the host interface 118 and the transmission interface 134 may also respectively comprise other layers of signal processing circuits or other devices not shown in FIG. 1. For example, the host interface 118 and the transmission interface 134 may further comprise an application layer signal processing circuit, respectively, to perform higher-level signal processing in compliance with the application layer communication protocol.

It is to be further noted that FIG. 1 is a simplified block diagram, wherein only the elements relevant to the invention are shown. As will be readily appreciated by a person of ordinary skill in the art, the data storage device and the host device, as well as the host interface and transmission interface comprised therein, may further comprise other components not shown in FIG. 1 and configured to implement the functions of related signal processing.

As mentioned above, since the standards complied by data storage devices will continue to evolve, the transmission interfaces of host devices and data storage devices developed in different periods may adopt different versions of the standards, resulting in a problem of incompatibility. For example, the same parameter may have different setting values in different versions of standard, which will lead to errors in signal or data transmission between the host device and the data storage device. To solve this problem, a parameter margin evaluation method for evaluating an appropriate range of setting values of at least one parameter, so as to determine a margin of said at least one parameter will be introduced in the following paragraphs. Here, a margin of a parameter may be defined by an appropriate range of setting values evaluated based on applications of different setting values of the parameter. Similarly, a margin of a combination of two or more than two parameters may be defined by an appropriate range of setting values evaluated based on applications of different combinations of the setting values of the parameters.

In addition, the proposed parameter margin evaluation method may also be applied during the development of the host device and/or the data storage device, so as to quickly scan the compatibility of the parameters utilized by the signal processing circuits in the host device and the data storage device. In this manner, the developers of host devices and/or data storage devices may set the values of the parameters utilized by the corresponding signal processing devices to more robust values, that is, the values with better anti-noise ability, by directly referring the obtained parameter margin or the obtained compatibility information in the product design phase. With the robust setting values, the error generated due to parameter value deviation (e.g. deviation caused by noise) in the practical operation of the host device and/or the data storage device is avoided.

Figure 2:
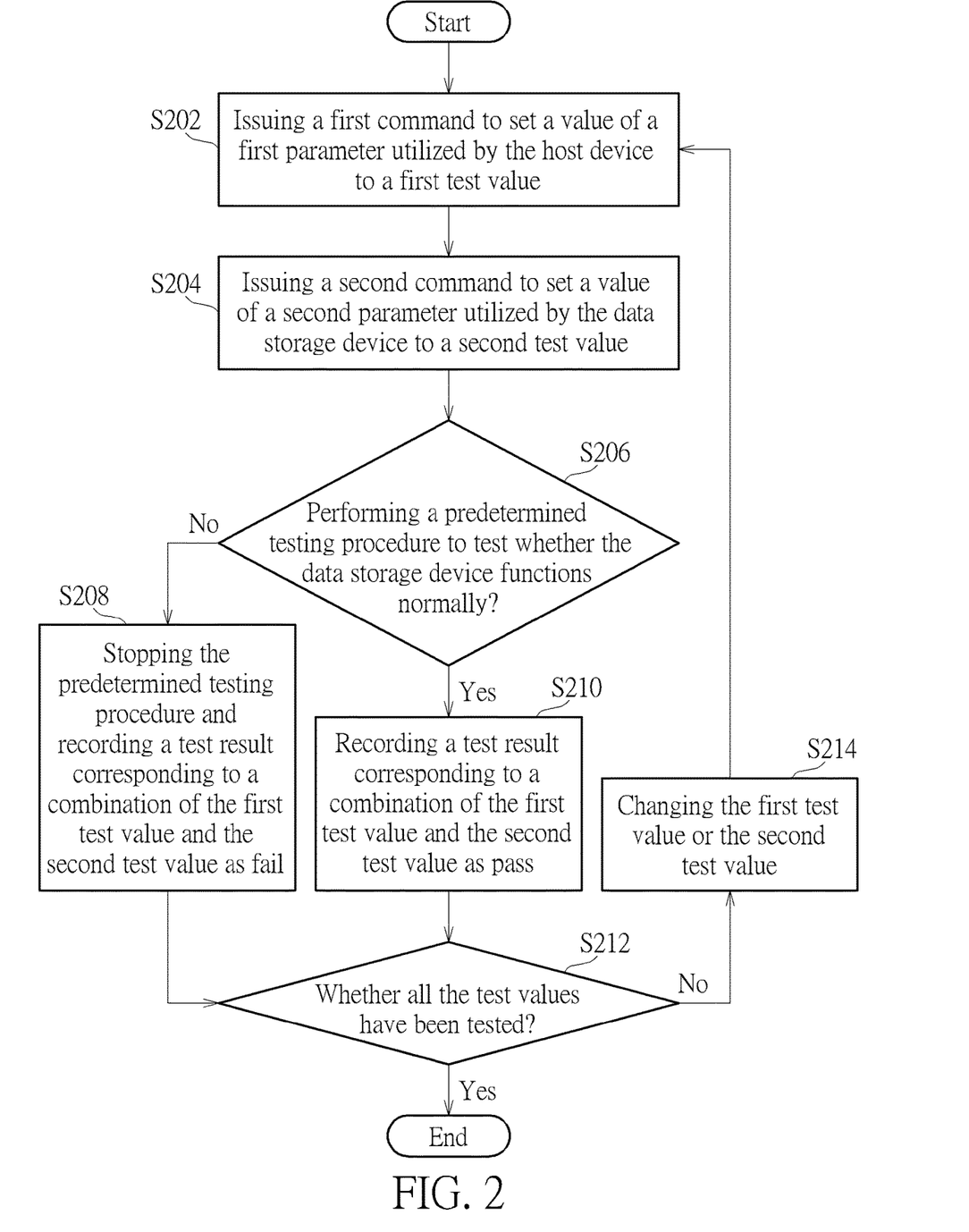
FIG. 2 shows an exemplary flow chart of a parameter margin evaluation method according to an embodiment of the invention.

FIG. 2 shows an exemplary flow chart of a parameter margin evaluation method according to an embodiment of the invention. The parameter margin evaluation method may comprise the following steps/operations performed or controlled by the host device (e.g. the host device 130 shown in FIG. 1) or a processor (e.g. the processor 131) comprised in the host device:

Operation/Step S202 (Operation/Step (A)): Issuing a first command to set a value of a first parameter utilized by the host device to a first test value.

Operation/Step S204 (Operation/Step (B)): Issuing a second command to set a value of a second parameter utilized by the data storage device to a second test value.

According to an embodiment of the invention, when the data storage device 100 is implemented as a storage device in compliance with the UFS standard, the first command and the second command may be standard UFS commands. For example, the first command may be a DME_SET command for setting parameters utilized on the host device side, and the second command may be a DME_PEER_SET command for setting parameters utilized by a memory controller on the data storage device side.

In addition, according to an embodiment of the invention, the first parameter may be a parameter utilized by a transmission interface of the host device (e.g., the transmission interface 134 shown in FIG. 1), and the second parameter may be a parameter utilized by a transmission interface (e.g., the host interface 118 shown in FIG. 1) of the data storage device. For example but not limited to, the first parameter and the second parameter may be the parameters utilized by physical layer circuits configured in the corresponding transmission interface.

Since the specification of standard complied by the transmission interface or the standard itself usually specifies the range of setting values for each parameter (i.e., the range of values that can be set), and the values within the range may form a group, therefore, the processor 131 may select a value (that has not been tested) from a first group comprising a plurality of setting values associated with the first parameter as the first test value and select a value (that has not been tested) from a second group comprising a plurality of setting values associated with the second parameter as the second test value.

Operation/Step S206 (Operation/Step (C)): Controlling the data storage device to perform a predetermined testing procedure to test whether the data storage device functions normally when the first test value and the second test value are applied. According to an embodiment of the invention, the predetermined testing procedure may comprise one or more access operations of the data storage device, one or more operations of switching operation modes of the data storage device and one or more operations of switching a physical layer data rate of the data storage device. The predetermined testing procedure will be described in more detailed in the following paragraphs.

When an error occurs at any stage of the predetermined testing procedure or in any operation comprised in the predetermined testing procedure when the data storage device performs the predetermined testing procedure, it is determined that the data storage device is unable to function normally, and operation/step S208 is performed.

Operation/Step S208 (Operation/Sub-steps: (C1) and (C2)): Stopping the predetermined testing procedure when determining that the data storage device is unable to function normally in the predetermined testing procedure, and recording a test result corresponding to a combination of the first test value currently set for the first parameter and the second test value currently set for the second parameter as fail (that is, the current combination of test values is unable to pass the test).

When no error occurs at the stages of the predetermined testing procedure or in the operations comprised in the predetermined testing procedure when the data storage device performs the predetermined testing procedure, it is determined that the data storage device is able to function normally when the first test value and the second test value are applied, and operation/step S210 is performed.

Operation/Step S210 (Operation Sub-step: (C3)): Recording a test result corresponding to a combination of the first test value currently set for the first parameter and the second test value currently set for the second parameter as pass.

Operation/Step S212: Determining whether all the test values comprised in the first group and all the test values comprised in the second group have been tested. When all the test values comprised in the first group and all the test values comprised in the second group have been tested, the predetermined testing procedure may be ended, and an appropriate range of setting values for the first parameter and an appropriate range of setting values for the second parameter may be evaluated according to the obtained test results (for example, the test results of a plurality of combinations of the setting values in the first group and the setting values in the second group) (Operation/Step (E)), so as to determine the margin of the setting values corresponding to the first parameter and the margin of the setting values corresponding to the second parameter. On the other hand, when not all the test values comprised in the first group or not all the test values comprised in the second group have been tested, operation/step S214 is performed.

Operation/Step S214 (Operation/Step (D)): changing the first test value according to the setting values comprised in the first group or changing the second test value according to the setting values comprised in the second group and returning to the operation/step S202 to re-perform the predetermined testing procedure by applying the first test value and the second test value that are currently set to the first parameter and the second parameter. With the determination in operation/step S212, at least the operations/steps of S202, S204, S206 and S214 may be repeatedly performed until all the test values in the first group and all the test values in the second group have been tested.

According to an embodiment of the invention, after obtaining the margin of the setting values corresponding to the first parameter and the margin of the setting values corresponding to the second parameter, the values of the first parameter and the second parameter may be set according to the margins. For example, the values of the first parameter and the second parameter may be set to the ones that are applicable to both the host device and the data storage device according to the margins. In this manner, errors occurred in the signal or data transmission between the host device and the data storage device due to incompatible settings of the parameters are effectively avoided.

According to an embodiment of the invention, the first parameter and the second parameter may be the same or different parameters, and here, the aforementioned "the same" may be substantially the same or with the same meaning. For example, in some embodiments of the invention, the first parameter and the second parameter may be the parameters corresponding to the registers utilized by the respective physical layer circuit comprised in the transmission interface of the host device and the data storage device (e.g., the transmission interface 134 and the host interface 118 shown in FIG. 1).

For example, in an embodiment of the invention, the first parameter/second parameter may be the parameter PA_Hibern8Time, which is used to specify the minimum time that a corresponding device must stay in the hibernate mode after entering the hibernate mode (i.e., the least time that cannot ask a module to leave the hibernate mode after the module enters the hibernate mode).

In another embodiment of the invention, the first parameter/second parameter may be a parameter PA_TActivate, which is used to specify the time required for a device to start the first action after the device is woken up.

In yet another embodiment of the invention, the first parameter/second parameter may be the parameter PA_TxHsG1PrepareLength, which is used to specify the preparation time required for a device to wake up and start outputting a signal in the high-speed mode, wherein the 'G1' represents the first speed gear Gear 1 of the High Speed (HS) mode, and may be replaced with other speed gears defined by MIPI.

In yet another embodiment of the invention, the first parameter/second parameter may be the parameter PA_TxHsG1SyncLength, which is used to specify the length of the synchronization pattern utilized by a device in the HS mode, for example, how many synchronization symbols will be output before the signal is formally output.

In yet another embodiment of the invention, the first parameter may be a parameter regarding a gain value of an equalizer configured in the host device, such as PA_Rx_Equalizer_Gain, which is used to specify the equalizer gain value. Referring back to FIG. 1, the signal processing circuit 134-1 may comprise an equalizer (not shown) for equalizing the RX signal, and the parameter PA_Rx_Equalizer_Gain may be used to set the gain value of the equalizer.

In yet another embodiment of the invention, the first parameter may be an amplitude parameter TX_Amplitude or a De-emphasis parameter TX_De-emphasis utilized by the host device, which is used to specify the amplitude of the TX signal or the De-emphasis Ratio of the amplitude.

Figure 3:
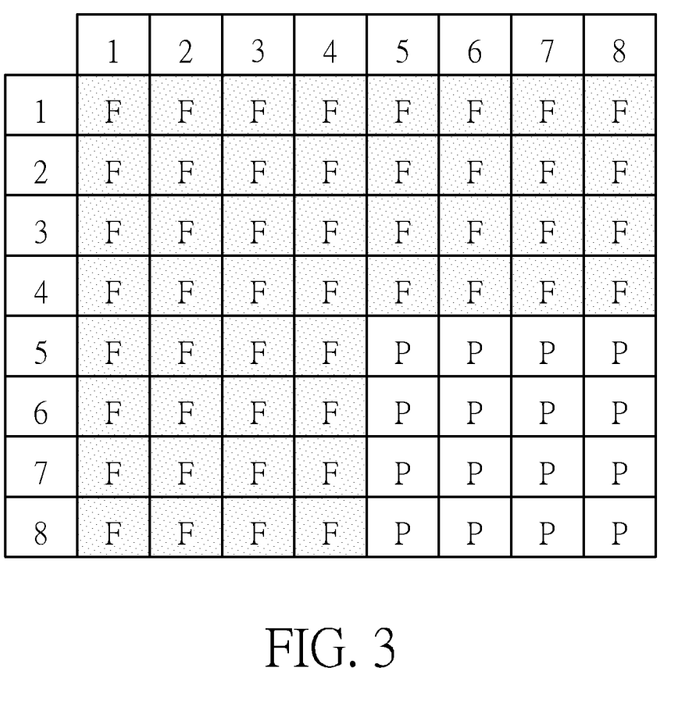
FIG. 3 shows exemplary test results according to an embodiment of the invention.

FIG. 3 shows exemplary test results according to an embodiment of the invention. In this example, the first parameter is the parameter PA_Hibern8Time utilized by the host device, and the second parameter is the parameter PA_Hibern8Time utilized by the data storage device. It is assumed that, according to the specification of the standard complied by the transmission interface, the range of values that can be set for the first parameter and the range of values that can be set for the second parameter may respectively comprise 8 setting values, which are distinguished by index values 1~8. The table in FIG. 3 shows the test result corresponding to each combination of those setting values. The index values on the horizontal axis may represent the 8 setting values corresponding to the parameter PA_Hibern8Time utilized by the host device, and the index values on the vertical axis may represent the 8 setting values corresponding to the parameter PA_Hibern8Time utilized by the data storage device, the letter 'P' represents that the corresponding combination of the parameters has passed the predetermined testing procedure, and the letter 'F' represents that the corresponding combination of the parameters has not passed the predetermined testing procedure.

As can be seen in FIG. 3, the area marked by the letter 'P' in FIG. 3 defines the margin of the setting values corresponding to the parameter PA_Hibern8Time. The host device and/or the data storage device (or the developer or manufacturer of the host device and/or the data storage device) may refer to the information of this margin to set the parameter PA_Hibern8Time utilized by each transmission interface to a more robust value. According to an embodiment of the invention, the host device and/or the data storage device may select setting values, which are far away from the setting values that would cause the predetermined testing procedure to fail, from the combinations of setting values that would pass the predetermined testing procedure. As an example, in the embodiment shown in FIG. 3, the setting values corresponding to the index value 7 or 8 may be selected. According to another embodiment of the invention, the host device and/or the data storage device may select a more moderate value from the obtained margins. For example, the setting value corresponding to the index value 6 or 7 may be selected in this example.

It is to be noted that although some parameters are listed above as examples, the invention should not be limited thereto. The proposed parameter margin evaluation method may be applied to any parameter that is utilized in the data storage system.

In addition, it is to be also noted that although FIG. 2 and FIG. 3 use two parameters as an example to illustrate the parameter margin evaluation method and the follow-up application of evaluated margin, the number of parameters is not a limit in the proposed method. For example, in some embodiments of the invention, the flow of the parameter margin evaluation method shown in FIG. 2 may only comprise one of the operations/steps S202 and S204, or may further comprise one or more parameter value setting operations/steps other than the operations/steps S202 and S204, for setting the test values of the parameters utilized by the host device or the data storage device.

In addition, in some embodiments of the invention, the test results shown in FIG. 3 may be the test results obtained after applying the setting values of only one parameter, or may be the test results obtained after applying the setting values of two or more parameters.

Figure 4:
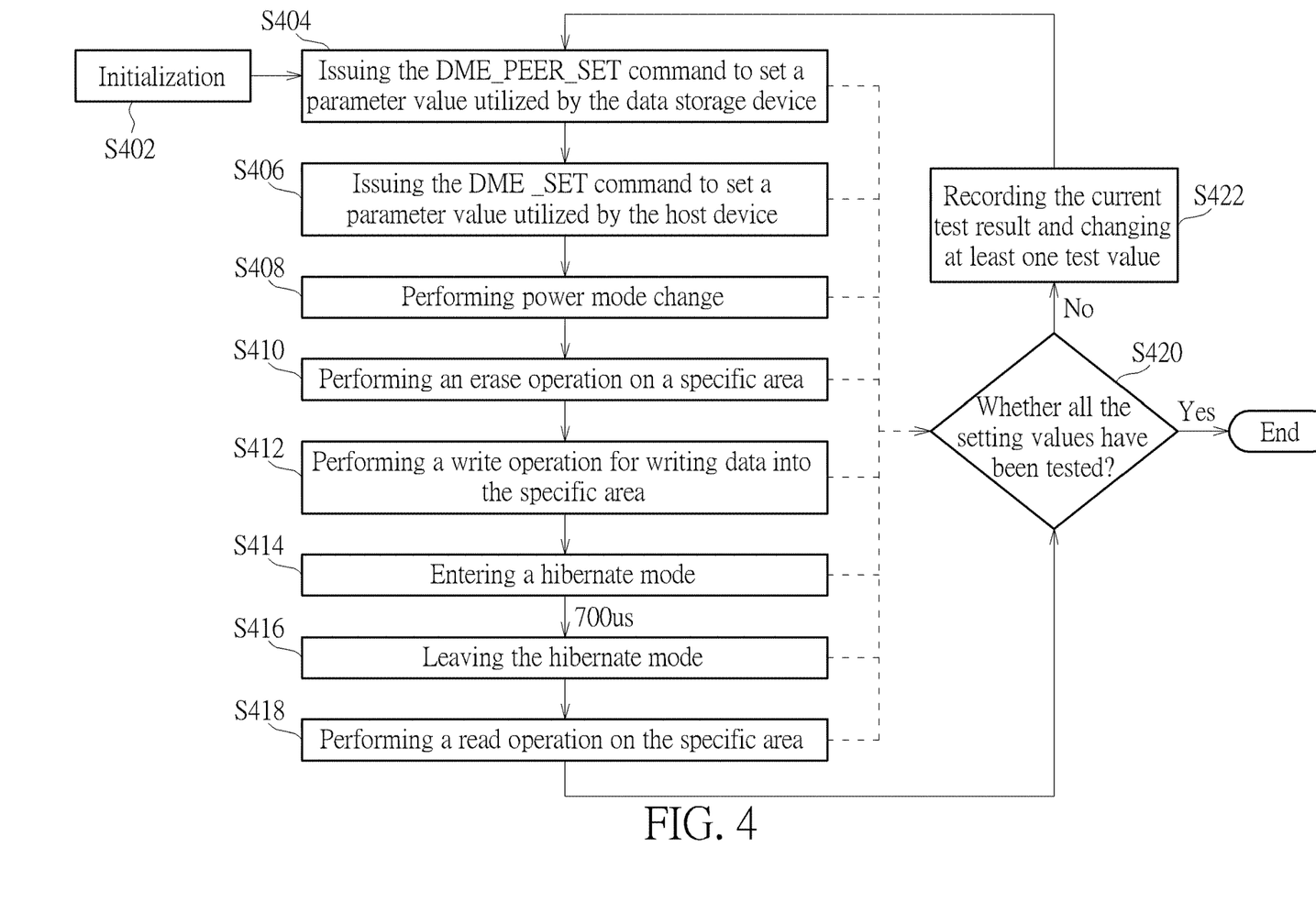
FIG. 4 shows an exemplary flow chart of a parameter margin evaluation method according to another embodiment of the invention.

FIG. 4 shows an exemplary flow chart of a parameter margin evaluation method according to another embodiment of the invention. The parameter margin evaluation method may comprise the following steps/operations performed or controlled by the host device (e.g. the host device 130 shown in FIG. 1) or a processor (e.g. the processor 131) comprised in the host device:

Step S402: Initializing the data storage device 100 by the host device 130 after the data storage system 150 is supplied with power. At this time, the data storage device 100 operates in a low-speed mode.

Step S404: Issuing the DME_PEER_SET command by the host device 130 to set a parameter value utilized by the data storage device 100. As described above, the value of a parameter utilized by the data storage device 100 may be set to a currently selected test value.

Step S406: Issuing the DME_SET command by the host device 130 to set a parameter value utilized by the host device 130. As described above, the value of a parameter utilized by the host device 130 may be set to a currently selected test value.

According to an embodiment of the invention, when the data storage device 100 is implemented as a storage device in compliance with the UFS standard, the host device 130 may set the physical layer parameters through the UFS Application Layer (UFS Application Layer, UAP). For example, the UFS Transport Protocol (UTP) layer is entered through the UFS Command Set (UCS) to transmit the physical layer parameters to the UIC layer, thereby modifying the physical layer parameters of the host device 130 and the data storage device 100.

After the parameter setting is completed, the data storage device 100 may be controlled to perform the predetermined testing procedure.

Step S408: Issuing a Power Mode Change (PMC) request by the host device 130 to switch from the low-speed mode to the high-speed mode (e.g. perform power mode change). For example, the data rate of the corresponding transmission interface 134 of the host device 130 and the data rate of the corresponding transmission interface (e.g., the host interface 118) of the data storage device 100 are switched from the low-speed mode to the high-speed mode.

Step S410: Issuing an erase command by the host device 130 to trigger the data storage device 100 to perform an erase operation for erasing data in a specific area of the memory device 120.

Step S412: Issuing a write command by the host device 130 to trigger the data storage device 100 to perform a write operation for writing data into a specific area of the aforementioned memory device 120.

Step S414: Issuing a hibernation command by the host device 130 to trigger the data storage device 100 to enter a hibernate mode.

Step S416: Waiting for a predetermined time (for example but not limited to, 700 microseconds (us) as shown in FIG. 4), and then waking up the data storage device 100 by the host device to trigger the data storage device 100 to leave the hibernate mode.

Step S418: Issuing a read command by the host device 130 to trigger the data storage device 100 to perform a read operation for reading data stored in the specific area of the aforementioned memory device 120. The host device 130 may then compare the read data with the data written in step S412 to determine whether any error occurs in the data.

In this embodiment, if an error occurs during the performance of any one of steps S404 to S418, the host device 130 may directly terminate the predetermined testing procedure and perform step S420. According to an embodiment of the invention, the host device 130 may determine whether an error has occurred according to the response message from the data storage device 100, and determine whether an error has occurred according to the comparison result between the read data and the written data. If an error has occurred when the data storage device 100 is performing the operations corresponding to steps S404 to S418, the data storage device 100 may report the error to the host device 130 through a response message. If no error has occurred when the data storage device 100 is performing the operations corresponding to steps S404 to S418, the data storage device 100 may respond to the host device 130 with no error (e.g., by responding an 'OK' to the host device 130).

For discrimination, in FIG. 4, the dotted line represents the path when an error has occurred, and the solid line represents the path when no error has occurred.

Step S420: Determining whether all the setting values have been tested. If the determination result shows yes, the testing procedure may be ended. If the determination result shows no, step S422 is performed.

Step S422: Recording the current test result, and selecting another test value as the new setting value to be tested (that is, at least one test value is changed).

As described above, the predetermined testing procedure may comprise one or more access operations of the data storage device 100 (e.g., steps S410, S412, and S418), one or more operations of switching operation modes of the data storage device 100 (S414 and S416), and one or more operations of switching a physical layer data rate of the data storage device (e.g., steps S402 and S408).

In addition, as described above, after the testing procedure ends, the host device 130 may evaluate the appropriate range of setting values of one or more parameters according to the obtained test results, so as to determine the margin corresponding to each parameter. After the margin of the parameter is obtained, the value of the parameter may be set or adjusted according to the margin, which effectively avoids errors to be generated in signal or data transmission between the host device and the data storage device due to incompatible parameter settings.

As mentioned above, since the data storage devices and the electronic products (host device) equipped with the corresponding transmission interface may adopt different versions of standard, a compatibility problem occurs, resulting in the signal or data transmission error occurred due to incompatible parameter settings. With the proposed parameter margin evaluation method, during the development of the host device and/or the data storage device, the compatibilities of the parameters utilized by the signal processing circuits of the host device and the data storage device are quickly scanned, so that developers of the host device and/or the data storage devices may directly refer to the obtained parameter margins or compatibility information in the product design phase and set the parameters utilized by the corresponding signal processing circuit to more robust values, that is, the values with better anti-noise ability. With the robust setting values, the error generated due to parameter value deviation (e.g. deviation caused by noise) in the practical operation of the host device and/or the data storage device is avoided.

In addition, the proposed parameter margin evaluation method may also be applied to the test and verification phase of corresponding products. By quickly scanning the setting values of the parameters utilized by the signal processing circuits in the host device and the data storage device, the compatibilities of the setting values for the parameters may be verified and parameter margins may be evaluated, which is helpful to calibrate the setting values of the parameters utilized by the corresponding signal processing circuits to the setting values with optimal performance.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A data storage system, comprising:
   a data storage device; and
   a host device, coupled to the data storage device, to determine a margin of a parameter utilized by at least one transmission interface of the data storage device and the host device, wherein the host device performs a plurality of operations comprising:
   (A) issuing a first command to set a value of a first parameter utilized by the host device to a first test value, wherein the first test value is selected from a first group comprising a plurality of setting values associated with the first parameter;
   (B) issuing a second command to set a value of a second parameter utilized by the data storage device to a second test value, wherein the second test value is selected from a second group comprising a plurality of setting values associated with the second parameter;
   (C) controlling the data storage device to perform a predetermined testing procedure to test whether the data storage device functions normally when the first test value and the second test value are applied; and
   (D) changing the first test value according to the setting values comprised in the first group or changing the second test value according to the setting values comprised in the second group and re-performing operations (A) to (C), wherein operation (D) is repeatedly performed until all the test values in the first group and the second group have been tested.

2. The data storage system as claimed in claim 1, wherein when performing the operation (C), the operations performed by the host device further comprises:
   (C-1) when determining that the data storage device is unable to function normally in the predetermined testing procedure, stopping the predetermined testing procedure; and (C-2) recording a test result corresponding to a combination of the first test value currently set for the first parameter and the second test value currently set for the second parameter as fail.

3. The data storage system as claimed in claim 2, wherein the operations performed by the host device further comprises:
(C-3) recording the test result corresponding to the combination of the first test value currently set for the first parameter and the second test value currently set for the second parameter as pass when determining that the data storage device functions normally in the predetermined testing procedure.

4. The data storage system as claimed in claim 3, wherein the operations performed by the host device further comprises:
(E) evaluating an appropriate range of setting values for the first parameter and an appropriate range of setting values for the second parameter according to a plurality of test results corresponding to a plurality of combinations of the setting values comprised in the first group and the setting values comprised in the second group.

5. The data storage system as claimed in claim 1, wherein the predetermined testing procedure comprises a plurality of access operations of the data storage device.

6. The data storage system as claimed in claim 1, wherein the predetermined testing procedure comprises a plurality of operations of switching operation modes of the data storage device.

7. The data storage system as claimed in claim 1, wherein the predetermined testing procedure comprises at least an operation of switching a physical layer data rate of the data storage device.

8. The data storage system as claimed in claim 1, wherein the first parameter is a parameter utilized by a transmission interface of the host device and the second parameter is a parameter utilized by a transmission interface of the data storage device.

9. The data storage system as claimed in claim 1, wherein the first parameter is a parameter utilized by a physical layer circuit of the host device and the second parameter is a parameter utilized by a physical layer circuit of the data storage device.

10. A parameter margin evaluation method for evaluating an appropriate range of setting values of at least one parameter to determine a margin of said at least one parameter, wherein said at least one parameter is a parameter utilized by at least one transmission interface in a data storage system, and the parameter margin evaluation method comprises following steps:
(A) setting a value of a first parameter utilized by a host device of the data storage system to a first test value, wherein the first test value is selected from a first group comprising a plurality of setting values associated with the first parameter;
(B) setting a value of a second parameter utilized by a data storage device of the data storage system to a second test value, wherein the second test value is selected from a second group comprising a plurality of setting values associated with the second parameter;
(C) controlling the data storage device to perform a predetermined testing procedure to test whether the data storage device functions normally when the first test value and the second test value are applied; and
(D) changing the first test value according to the setting values comprised in the first group or changing the second test value according to the setting values comprised in the second group and re-performing steps (A) to (C), wherein step (D) is repeatedly performed until all the test values in the first group and the second group have been tested.

11. The parameter margin evaluation method as claimed in claim 10, wherein step (C) further comprises following sub-steps:
(C-1) when it is determined that the data storage device is unable to function normally in the predetermined testing procedure, stopping the predetermined testing procedure; and
(C-2) recording a test result corresponding to a combination of the first test value currently set for the first parameter and the second test value currently set for the second parameter as fail.

12. The parameter margin evaluation method as claimed in claim 11, wherein step (C) further comprises following sub-step:
(C-3) recording the test result corresponding to the combination of the first test value currently set for the first parameter and the second test value currently set for the second parameter as pass when it is determined that the data storage device functions normally in the predetermined testing procedure.

13. The parameter margin evaluation method as claimed in claim 12, further comprising following step:
(E) evaluating an appropriate range of setting values for the first parameter and an appropriate range of setting values for the second parameter according to a plurality of test results corresponding to a plurality of combinations of the setting values comprised in the first group and the setting values comprised in the second group.

14. The parameter margin evaluation method as claimed in claim 10, wherein the predetermined testing procedure comprises a plurality of access operations of the data storage device.

15. The parameter margin evaluation method as claimed in claim 10, wherein the predetermined testing procedure comprises a plurality of operations of switching operation modes of the data storage device.

16. The parameter margin evaluation method as claimed in claim 10, wherein the predetermined testing procedure comprises at least an operation of switching a physical layer data rate of the data storage device.

17. The parameter margin evaluation method as claimed in claim 10, wherein the first parameter is a parameter utilized by a transmission interface of the host device and the second parameter is a parameter utilized by a transmission interface of the data storage device.

18. The parameter margin evaluation method as claimed in claim 10, wherein the first parameter is a parameter utilized by a physical layer circuit of the host device and the second parameter is a parameter utilized by a physical layer circuit of the data storage device.

* * * * *